(No Model.)

G. P. SHERMAN.
CAR AXLE LUBRICATOR.

No. 412,424. Patented Oct. 8, 1889.

Witnesses.
O. N. Keeney,
Anna Faust.

Inventor.
George P. Sherman
By Erwin & Benedict
Attorneys.

UNITED STATES PATENT OFFICE.

GEORGE P. SHERMAN, OF MILWAUKEE, WISCONSIN, ASSIGNOR OF ONE-HALF TO JOHN E. MITCHELL, OF SALEM, IOWA.

CAR-AXLE LUBRICATOR.

SPECIFICATION forming part of Letters Patent No. 412,424, dated October 8, 1889.

Application filed February 19, 1889. Serial No. 300,480. (No model.)

*To all whom it may concern:*

Be it known that I, GEORGE P. SHERMAN, of Milwaukee, in the county of Milwaukee and State of Wisconsin, have invented new and useful Improvements in Devices for Lubricating Journals; and I do hereby declare the following to be a full, clear, and exact description of said invention, reference being had to the accompanying drawings, and to the letters or figures of reference marked thereon, which form a part of this specification.

My invention relates to improvements in devices for lubricating journal-bearings, and the same is more especially adapted to be used with the journal-bearings of car-axles, and it pertains to that class of lubricating devices by which the lubricant is conveyed from its receptacle to the surface of the journal by a rotating wheel.

The construction of my invention is explained by reference to the accompanying drawings, in which—

Figure 1:
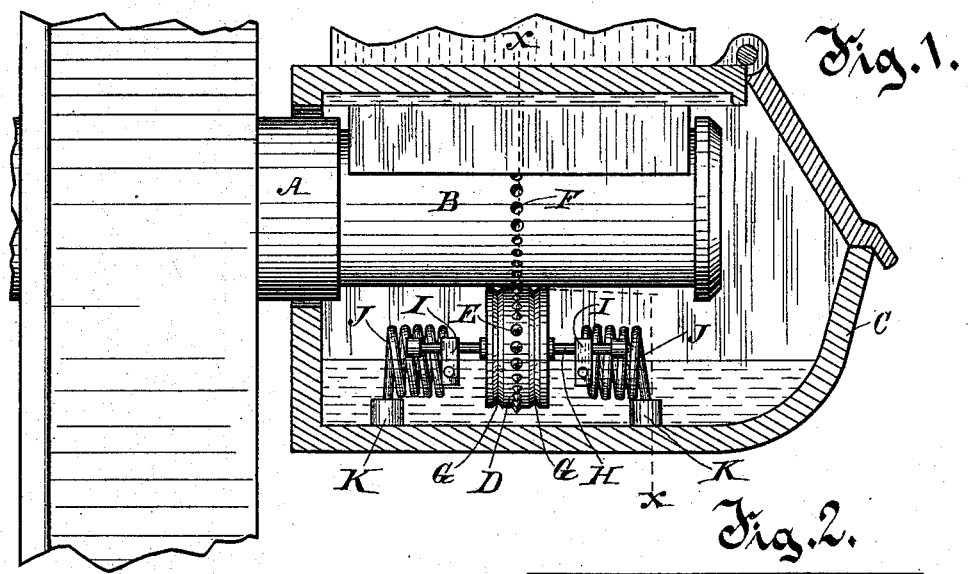
Figures 2, 3:
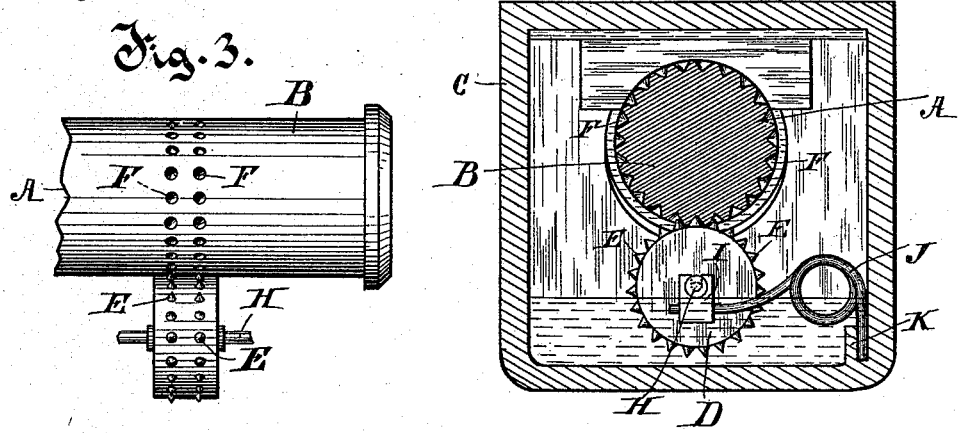

Figure 1 represents a longitudinal vertical section through the journal-box of a car-axle, showing a side view of the journal, the lubricating-wheel, and the mechanism for retaining the lubricating-wheel in contact with the journal. Fig. 2 represents a cross-section of the device shown in Fig. 1, drawn on line X X thereof. Fig. 3 is a detail showing a modified form of the contiguous surfaces of the lubricating-wheel and journal.

Like parts are represented by the same reference-letters throughout the several views.

A represents a car-axle of ordinary construction.

B is the journal.

C is the journal-box, which also serves as a reservoir for the lubricant.

D represents the rotating wheel by which the lubricant is conveyed from the reservoir of the journal-box to the surface of the journal.

I am aware that a lubricating-wheel has heretofore been used for conveying a lubricant to the surface of a journal in which such lubricating-wheel is rotated solely by the frictional contact of its periphery with the surface of the journal, in which case it is obvious that, owing to the slight contact of the contiguous surfaces of said wheel and journal, the movement of the lubricating-wheel is liable to be stopped by the excess of friction of its supporting-axle in its journal-bearings over that of the frictional contact of its periphery with the journal, and said wheel is liable to stop rotating. By my improvement the periphery of the lubricating-wheel D is provided with one or more series of teeth or projections E, which are adapted to engage in a series of corresponding depressions or apertures F, formed in the periphery of the journal B, whereby it is obvious that the motion of the journal is transmitted to the lubricating-wheel, and the liability of said wheel becoming stopped by the friction of its supporting-axle is entirely overcome, and said lubricating-wheel is compelled to rotate with positive movement corresponding with that of the journal.

To increase the capacity of the lubricating-wheel for elevating the lubricant from the reservoir of the journal-box to the journal, the same is provided with grooves G G, in and by which the lubricant is not only elevated to the contiguous surfaces of the wheel and journal, but is carried by said grooves directly beneath said journal and past the point of contact of the two convexed surfaces, while it is obvious that with an ordinary lubricating-wheel having a smooth periphery the greater part of the oil would be forced back by contact of the two opposing surfaces of the wheel and journal. The series of teeth or projections E are preferably made conical in shape, and the depressions or apertures F are also made conical in shape to conform to the shape of said teeth E, whereby it is obvious that when the points of said teeth enter any portion of said depressions they will be caused by the converging surfaces of said depressions to be brought to their centers, and the liability of said teeth and depressions getting out of mesh is thereby obviated. The lubricating-wheel D is supported upon an elongated journal-bearing or axle H, the respective ends of which extend through and past their respective journal-bearings I I, whereby said lubricating-wheel and its supporting-axle are free to move backward and forward independently of the journal-box C and the journal-bearings I I, as may be required to conform to the vibratory or reciprocating movement of the journal B, whereby said lubricating-wheel and journal are permitted to at all times retain the same relative position to each other, and are in no way interfered with by said vibratory movement of the journal-bearing or inclosing journal-box.

The lubricating-wheel D, with its supporting-axle H and journal-bearings I I, is supported upon elastic bearings from the inclosing journal-box C. A preferred form of elastic bearings for thus supporting said parts is illustrated in Figs. 1 and 2, which consists of two metallic springs J J, respectively connected at one end in retaining-sockets K with the side of the journal-box, and their free ends are respectively secured to the journal-bearings I I. The springs J J are preferably fitted loosely in their retaining-sockets K, so that they may turn slightly therein, as may be required, to permit of a slight vibratory movement of the journal-bearings I.

The method herein described of retaining in suspension the solid ingredients of a lubricant with the fluid ingredients, of less specific gravity, by agitation and simultaneously applying the same to the bearing-surfaces of a journal by the rotation of a lubricating-wheel actuated by the journal to which said lubricant is applied I have made the subject-matter of a separate application which was filed on the same date hereof and is No. 300,479.

Having thus described my invention, what I claim as new, and desire to secure by Letters Patent, is—

1. In a device for lubricating journals, the combination, within the inclosing journal-box, of a rotating lubricating-wheel provided with a series of teeth projecting from the surface of its periphery, with the journal provided with corresponding depressions for the reception of said series of teeth, and an elastic or flexible support for retaining the peripheries of said lubricating-wheel and journal in contact, substantially as and for the purpose specified.

2. The combination, within a journal-box C, of a lubricating-wheel D, provided with a series of teeth E and lubricant-conveying grooves G, and journal B, provided with series of depressions or apertures F, formed for the reception of said series of teeth E, and supporting-bearings for retaining said wheel D in contact with said journal, substantially as and for the purpose specified.

3. The combination of the journal-box C, lubricating-wheel D, provided with a series of teeth E, wheel-supporting axle H, axle-supporting journal-bearings I I, located upon the respective sides of said axle H, adapted to permit of the lateral movement of said axle with the thereon-supported wheel D, supporting-springs J, affixed at one end to the inclosing-box C and at their opposing ends to said journal-bearings I, and journal B, provided with a series of depressions F for the reception of said series of teeth E, all substantially as and for the purpose specified.

In testimony whereof I affix my signature in presence of two witnesses.

GEORGE P. SHERMAN.

Witnesses:
  JAS. B. ERWIN,
  C. T. BENEDICT.